US008890946B2

(12) United States Patent
Publicover et al.

(10) Patent No.: US 8,890,946 B2
(45) Date of Patent: Nov. 18, 2014

(54) SYSTEMS AND METHODS FOR SPATIALLY CONTROLLED SCENE ILLUMINATION

(75) Inventors: Nelson G. Publicover, Reno, NV (US); Jason Heffernan, Reno, NV (US)

(73) Assignee: Eyefluence, Inc., Reno, NV (US)

( * ) Notice: Subject to any disclaimer, the term of this patent is extended or adjusted under 35 U.S.C. 154(b) by 825 days.

(21) Appl. No.: 12/715,177

(22) Filed: Mar. 1, 2010

(65) Prior Publication Data

US 2011/0211056 A1   Sep. 1, 2011

(51) Int. Cl.
*H04N 7/18*   (2006.01)
*G06K 9/00*   (2006.01)

(52) U.S. Cl.
USPC ............................................ 348/78; 382/103

(58) Field of Classification Search
CPC .......... G06F 3/013; A61F 2009/00846; G02B 27/017; G02B 2027/0138; G02B 2027/0178; G06T 2207/30041; A63B 2071/0666; A63B 2220/806
See application file for complete search history.

(56) References Cited

U.S. PATENT DOCUMENTS

| | | |
|---|---|---|
| 3,689,135 A | 9/1972 | Young et al. |
| 3,798,599 A | 3/1974 | Kafafian |
| 3,863,243 A | 1/1975 | Skolnick et al. |
| 3,966,310 A | 6/1976 | Larson |
| 4,102,564 A | 7/1978 | Michael |
| 4,359,724 A | 11/1982 | Zimmerman et al. |
| 4,815,839 A | 3/1989 | Waldorf |
| 4,850,691 A | 7/1989 | Gardner et al. |
| 4,852,988 A | 8/1989 | Velez et al. |
| 4,894,777 A | 1/1990 | Negishi |
| 4,953,111 A | 8/1990 | Yamamoto et al. |
| 4,967,186 A | 10/1990 | Ludmirsky et al. |
| 4,988,183 A | 1/1991 | Kasahara et al. |
| 5,070,883 A | 12/1991 | Kasahara et al. |

(Continued)

FOREIGN PATENT DOCUMENTS

| | | |
|---|---|---|
| EP | 0125808 | 11/1984 |
| EP | 0 679 984 | 4/1995 |

(Continued)

OTHER PUBLICATIONS

Hewlett-Packard GMBH: "Helmet-Mounted Display for Data Recall and Direct Consultation During Surgical Operation," Jan. 1996, Research Disclosure, Mason Publications, Hampshire, GB.

(Continued)

*Primary Examiner* — Peling Shaw
(74) *Attorney, Agent, or Firm* — William A. English; Vista IP Law Group LLP

(57) ABSTRACT

A scene illumination system is provided that produces spatially uniform or controlled brightness levels for machine vision applications. The system includes a camera, multiple light sources that preferentially illuminate different regions within the camera's field-of-view, and a processing unit coupled to the camera and light sources. Focal regions of the light sources within the camera's field-of-view are sampled to determine average regional brightness and compared to target brightness levels. The processing unit controls the light sources to increase or decrease illumination levels to converge toward the target brightness levels within the field-of-view. This modulation of the light sources may be repeated with successive video images until target brightness levels are achieved. Once achieved, the iterative feedback control may be locked-in for some applications, while for others, the iterative process may continue periodically or continuously to account for different scenes or changes in lighting conditions.

52 Claims, 7 Drawing Sheets

(56) References Cited

U.S. PATENT DOCUMENTS

| | | |
|---|---|---|
| 5,093,567 A | 3/1992 | Staveley |
| 5,189,512 A | 2/1993 | Cameron et al. |
| 5,214,456 A | 5/1993 | Gersten |
| 5,341,181 A | 8/1994 | Godard |
| 5,345,281 A | 9/1994 | Taboada et al. |
| 5,402,109 A | 3/1995 | Mannik |
| 5,447,166 A | 9/1995 | Gevins |
| 5,469,143 A | 11/1995 | Cooper |
| 5,478,239 A | 12/1995 | Fuerst |
| 5,481,622 A | 1/1996 | Gerhardt et al. |
| 5,566,067 A | 10/1996 | Hobson et al. |
| 5,570,698 A | 11/1996 | Liang et al. |
| 5,583,590 A | 12/1996 | Clupper |
| 5,583,795 A | 12/1996 | Smyth |
| 5,682,144 A | 10/1997 | Mannik |
| 5,689,241 A | 11/1997 | Clarke et al. |
| 5,704,369 A | 1/1998 | Scinto |
| 5,726,916 A | 3/1998 | Smyth |
| 5,748,113 A | 5/1998 | Torch |
| 5,778,893 A | 7/1998 | Potter |
| 5,795,306 A | 8/1998 | Shimotani |
| 5,861,936 A | 1/1999 | Sorenson |
| 5,867,587 A | 2/1999 | Aboutalib et al. |
| 5,956,125 A | 9/1999 | Rosse |
| 6,003,991 A | 12/1999 | Viire |
| 6,087,941 A | 7/2000 | Ferraz |
| 6,088,470 A | 7/2000 | Camus et al. |
| 6,090,051 A | 7/2000 | Marshall |
| 6,091,378 A | 7/2000 | Richardson et al. |
| 6,091,546 A | 7/2000 | Spitzer |
| 6,097,295 A | 8/2000 | Griesinger et al. |
| 6,116,736 A | 9/2000 | Stark |
| 6,152,563 A | 11/2000 | Hutchinson et al. |
| 6,163,281 A | 12/2000 | Torch |
| 6,246,344 B1 | 6/2001 | Torch |
| 6,246,779 B1 | 6/2001 | Fukui |
| 6,247,813 B1 | 6/2001 | Kim |
| 6,252,977 B1 | 6/2001 | Salganicof et al. |
| 6,260,968 B1 | 7/2001 | Stark et al. |
| 6,334,683 B2 | 1/2002 | Apple et al. |
| 6,346,887 B1 | 2/2002 | Van Orden et al. |
| 6,346,929 B1 | 2/2002 | Fukushima |
| 6,373,961 B1 | 4/2002 | Richardson et al. |
| 6,388,639 B1 | 5/2002 | Hoshino |
| 6,433,760 B1 | 8/2002 | Vaissie et al. |
| 6,511,424 B1 | 1/2003 | Moore-Ede et al. |
| 6,542,081 B2 | 4/2003 | Torch |
| 6,611,618 B1 | 8/2003 | Peli |
| 6,634,553 B2 | 10/2003 | Reasoner et al. |
| 6,637,883 B1 | 10/2003 | Tengshe et al. |
| 6,775,060 B2 | 8/2004 | Peli et al. |
| 6,820,979 B1 | 11/2004 | Stark |
| 6,864,473 B2 | 3/2005 | Chretien et al. |
| 6,867,752 B1 | 3/2005 | Yamazaki et al. |
| 6,927,694 B1 | 8/2005 | Smith et al. |
| 6,959,102 B2 | 10/2005 | Peck |
| 6,997,556 B2 | 2/2006 | Pfleger |
| 7,046,215 B1 | 5/2006 | Bartlett |
| 7,071,831 B2 | 7/2006 | Johns |
| 7,081,720 B2 | 7/2006 | Burau et al. |
| 7,120,880 B1 | 10/2006 | Dryer |
| 7,206,435 B2 | 4/2007 | Fujimura et al. |
| 7,331,671 B2 | 2/2008 | Hammond |
| 7,344,251 B2 | 3/2008 | Marshall |
| 7,374,284 B2 | 5/2008 | Peli |
| 7,391,887 B2 | 6/2008 | Durnell |
| 7,391,888 B2 | 6/2008 | Hu et al. |
| 7,488,294 B2 | 2/2009 | Torch |
| 7,646,422 B2 | 1/2010 | Kiscanin et al. |
| 7,783,077 B2 | 8/2010 | Miklos et al. |
| 8,025,405 B2 | 9/2011 | Rehnstrom |
| 8,220,926 B2 | 7/2012 | Blixt et al. |
| 2001/0028309 A1 | 10/2001 | Torch |
| 2002/0024633 A1 | 2/2002 | Kim |
| 2004/0005083 A1* | 1/2004 | Fujimura et al. ............... 382/103 |
| 2004/0061680 A1 | 4/2004 | Taboada |
| 2005/0007552 A1 | 1/2005 | Fergason et al. |
| 2005/0099601 A1 | 5/2005 | MacDougall et al. |
| 2006/0110008 A1* | 5/2006 | Vertegaal et al. ............... 382/103 |
| 2007/0291232 A1 | 12/2007 | Marshall |
| 2008/0084490 A1 | 4/2008 | Masagaki |
| 2008/0111833 A1 | 5/2008 | Thorn et al. |
| 2008/0137909 A1 | 6/2008 | Lee et al. |
| 2008/0166052 A1 | 7/2008 | Hatano |
| 2008/0285801 A1 | 11/2008 | Heinzmann et al. |
| 2009/0072759 A1 | 3/2009 | Cheng |
| 2010/0328444 A1 | 12/2010 | Blixt et al. |
| 2011/0019874 A1 | 1/2011 | Jarbenpaa et al. |
| 2011/0109880 A1 | 5/2011 | Nummela |
| 2011/0182472 A1 | 7/2011 | Hansen |

FOREIGN PATENT DOCUMENTS

| | | |
|---|---|---|
| EP | 0 984 347 | 8/1998 |
| GB | 2284582 | 6/1995 |
| GB | 2390425 | 9/2004 |
| JP | 2000137792 | 5/2000 |
| JP | 2002143094 | 5/2002 |
| JP | 2006307611 | 11/2006 |
| JP | 2007195775 | 8/2007 |
| NL | 1021496 | 3/2004 |
| WO | 9849028 | 11/1998 |
| WO | 2006092022 | 9/2006 |
| WO | 2007016739 | 2/2007 |
| WO | 2007092512 | 8/2007 |
| WO | 2008001259 | 1/2008 |

OTHER PUBLICATIONS

PCT International Search Report and Written Opinion for PCT/US2011/026736, Applicant: EYE-COM Corporation, Forms PCT/ISA/220, PCT/ISA/210, and PCT/ISA/237; dated Dec. 7, 2011, 8 pages.

PCT International Preliminary Report on Patentability for corresponding International Application: PCT/US2011/026736, Applicant: EYE-COM Corporation, Forms PCT/IB/326, PCT/IB/373, and PCT/ISA/237, dated Sep. 13, 2012, 6 pages.

* cited by examiner

SYSTEMS AND METHODS FOR SPATIALLY CONTROLLED SCENE ILLUMINATION

STATEMENT REGARDING FEDERALLY SPONSORED RESEARCH AND DEVELOPMENT

The U.S. Government may have a paid-up license in this invention and the right in limited circumstances to require the patent owner to license others on reasonable terms as provided for by the terms of Grant No. 1 R43 CE 00151-01 awarded by the Department of Health and Human Services, Public Health Services, Centers for Disease Control (CDC), Department of Defense (US Army) Contract No. W81XWH-05-C-0045, U.S. Department of Defense Congressional Research Initiative No. W81XWH-06-2-0037, and U.S. Department of Transportation Congressional Research Initiative Agreement Award No. DTNH 22-05-H-01424.

FIELD OF THE INVENTION

The present invention relates to apparatus and methods for controlling illumination of objects, and, more particularly, to apparatus and methods for producing spatially controlled brightness, e.g., substantially uniform or varying brightness, within video camera images of objects, for example, an eye or face of an individual, by regulating multiple sources of illumination, e.g., for the purpose of machine vision.

BACKGROUND

This invention relates to illumination schemes for machine vision applications, particularly when surfaces and objects within the field-of-view of a camera vary in reflectivity. Conventional lighting schemes frequently produce shadows and/or glints (i.e., hot-spots) within scenes that contain curved surfaces or objects that rise above a single two-dimensional plane. These problems are exacerbated when lighting must be confined to a limited number of sources and/or when light sources must be located close to a scene that is being illuminated.

Applications that involve machine vision are becoming increasingly common-place. In part, this has arisen as a result of technological advances in the electronics and software development industries, and decreases in the cost of cameras and information processing units. A small number of examples from the range of machine vision applications include: object identification, distance measurements, food inspection, quality control in assembly lines, reading bar codes, object counting, safety monitoring, and biometrics. Sectors and industries that utilize machine vision include military, medical, security, semiconductor fabrication, manufacturing, robotics, and toys.

Almost all image processing techniques and algorithms are affected if regions within images have inadequate illumination. If illumination levels are too low, the result is an insufficient change in brightness intensities to differentiate boundaries of objects or regional changes in reflectance. Reduced signal or light intensities can also lead to a dominance of detector noise within images. Low signal-to-noise ratios generally lead to images that appear "grainy" and difficult to process.

Conversely, if illumination levels are too high, pixels within the camera or detector become saturated. Once again, fully saturated pixels provide no information about changes in brightness levels for image processing algorithms to differentiate edges or boundaries. In some types of video cameras, saturated pixels can also "bleed over" to elevate the apparent brightness of nearby pixels.

In most cases, the information content is lost in regions of images with too few or too many photons. No amount of image processing can retrieve the missing information. In these cases, illumination in all spatial regions of video images must be improved to generate reliable machine vision applications.

For example, precise measurements of object size involve the detection of the object edges where edges are identified as regions where there are sharp gradients in color or luminance. If the camera's view of the edge of an object is distorted by shadows, then the reliability and accuracy of edge-detection algorithms are degraded.

Machine vision applications that include object identification are particularly sensitive to lighting conditions. Dark corners, color changes due to illumination, luminance changes that result from different angles of surface illumination, shadows, and hot-spots can render an object unrecognizable due to lighting conditions.

The controlled illumination of objects is particularly difficult when illumination sources are confined to be close to the objects being illuminated. This confinement can be due, for example, to a desire to make an apparatus compact and/or to reduce power consumption by confining illumination only to the field-of-view of a camera. Such is the case when illuminating the eye using an apparatus mounted to eyewear or a head-mounted device. Examples of these types of systems or apparatus may be found in U.S. Pat. No. 7,515,054 B2 to William C. Torch, which discloses biosensor, communication, and controller applications facilitated by monitoring eye movements.

SUMMARY

The present invention is directed to apparatus and methods for controlling illumination of objects. More particularly, the present invention is directed to apparatus and methods for producing spatially controlled brightness, e.g., substantially uniform brightness, within video camera images of objects, for example, an eye or face of an individual, by regulating multiple sources of illumination, e.g., for the purpose of machine vision.

In light of the foregoing background, the apparatus, systems, and methods herein may provide an improved illumination method and system for machine vision applications. The method generally includes two or more electromagnetic radiation sources that illuminate different regions of a scene at angles that are distinct from the viewing angle of a camera. These illumination sources may each include one or more illuminating devices, such as incandescent bulbs, arc lamps, or light-emitting-diodes (LEDs). The camera may be a component of a frame grabber and processing system that produces feedback signals to individually control illumination sources based on captured images. Target brightness levels may be constant or may vary as a function of space (for example, to produce a gradient in brightness across a scene) and/or time (for example, when a scene is alternately illuminated by sources with different wavelengths). Controlled and/or uniform illumination may allow machine vision applications that involve location measurements and object identification to be performed more simply, quickly and reliably.

In accordance with one embodiment, systems and methods are provided that produce camera images with substantially spatially uniform and/or controlled scene brightness, particularly when there are spatial variations in reflectance within a scene.

In accordance with another embodiment, systems and methods are provided that produce images with controlled or substantially uniform brightness from surfaces that are curved and/or not coplanar with the image plane of a camera.

For example, the systems and methods may use one or more illumination sources that are positioned well away for the line-of-sight of the camera. Illumination from acute angles may help reveal fine structures such as surface cracks or indentations.

In accordance with yet another embodiment, systems and methods are provided that may reduce the effects of shadows generated by three-dimensional structures that rise above a surface. For example, the effects of shadows may be reduced by using multiple sources of electromagnetic radiation that illuminate a scene from contrasting angles.

In accordance with still another embodiment, systems and methods are provided that may reduce or avoid the effect of so-called "glints" or bright spots that arise as a result of point sources of illumination. The effects of glints may be avoided by steering light into a scene using sources at angles well away from the viewpoint of the camera.

In accordance with another embodiment, a system is provided for monitoring an eye of a person that includes a device configured to be worn on a person's head; a camera mounted on the device and positioned for viewing a first eye of the person wearing the device; and a plurality of light sources on the device that preferentially illuminate respective focal regions of the person's face around the first eye and within the camera's field-of-view. In an alternative embodiment, the camera and/or light sources may be mounted remotely from the person, e.g., to a dashboard or other interior structure of a vehicle.

A controller may be coupled to the camera and the light sources, the controller configured for sampling brightness in the respective focal regions of the light sources using the camera and modulating the light sources based on the sampled brightness to provide desired brightness levels within the respective focal regions. For example, the controller may be configured for sampling brightness from multiple pixels of the camera that correspond to a first focal region within the camera's field-of-view that is illuminated by a first light source, the controller combining the sampled brightness to determine an average brightness provided by the first light source, the controller modulating the first light source to provide a desired brightness level within the first focal region. Similarly, the controller may be configured for sampling brightness from a second or additional focal regions that are illuminated by a second or additional respective light sources, and modulating the light sources to provide desired brightness levels within the corresponding focal regions.

In one embodiment, the controller may be configured for amplitude modulation of at least one of the current and the voltage to the light source to provide the desired brightness levels in the respective focal regions. In addition or alternatively, the controller may be configured for pulse-width modulation of at least one of the current and the voltage to the light sources to provide the desired brightness levels.

Optionally, a processing unit may be coupled to the camera for receiving images of the first eye, e.g., to monitor and/or analyze the images of the first eye. The processing unit may include the controller or may be one or more separate processors.

In accordance with still another embodiment, a feedback controlled system is provided for producing spatially controlled illumination that includes a camera that measures scene brightness in two or more spatial regions of a field-of-view; light sources that preferentially illuminate corresponding regions within the camera's field-of-view; and a processor that computes average brightness within each region of the camera's field-of-view and modulates corresponding light sources to one or more target brightness levels to provide desired brightness levels within the field-of-view.

In one example, the system may include an electronic display, and the camera and/or light sources may be mounted relative to the display such that the camera and light sources are oriented towards a face of a person viewing the electronic display. In another example, the camera and/or light sources may be mounted to a dashboard or other structure of a vehicle such that the camera and/or light sources are oriented towards the face of an operator of the vehicle.

In yet another example, the camera and/or light sources may be mounted to a structure adjacent an assembly line or conveyor belt for obtaining images of objects being directed along the assembly line or conveyor belt. In still another example, the camera and/or light sources may be mounted to a structure adjacent a plurality of storage areas for obtaining images of objects located in the storage areas. For example, the light sources are mounted adjacent the assembly line, conveyor belt, or storage areas to preferentially illuminate respective focal regions within the camera's field-of-view, e.g., to facilitate identification of objects based on images acquired by the camera.

In any of these examples, the light sources may be operated substantially continuously or intermittently. For example, the light sources may be deactivated when the camera is inoperative. For example, if the camera is used to acquire images of the field-of-view separately from sampling the brightness within the regions preferentially illuminated by the respective light sources, the light sources may be activated only during the periods when the camera is activated to acquire images and/or to sample brightness, although the light sources may be activated intermittently during these periods, e.g., if pulse width modulation is used to control brightness of the light sources.

In accordance with yet another embodiment, a method is provided for controlling illumination of a first eye of a person. A camera may be positioned towards a person's face such that a first eye of the person lies within a field-of-view of the camera, and at least a portion of the person's face may be illuminated with a plurality of light sources that preferentially illuminate respective focal regions of the person's face around the first eye and within the camera's field-of-view. Brightness may be sampled in the respective focal regions of the light sources using the camera, and the light sources modulated based at least in part on the sampled brightness to provide desired brightness levels within the respective focal regions.

In accordance with still another embodiment, a scene illumination system is provided that may produce spatially uniform or controlled brightness levels for machine vision applications. For example, target brightness levels may be substantially the same throughout the camera's field-of-view, e.g., to generate substantially uniform brightness, or may vary as a function of location, e.g., to generate controlled brightness levels within a scene. In addition or alternatively, target brightness levels may also be made to vary with time.

In an exemplary embodiment, the system includes a camera, multiple light sources that preferentially illuminate different regions within the camera's field-of-view, and a processing unit coupled to the camera and light sources. Focal regions of the light sources within the camera's field-of-view may be sampled to determine average regional brightness and compared to target brightness levels. The processing unit may control the light sources to increase or decrease illumination levels to converge toward the target brightness levels within the field-of-view. This modulation of the light sources may be repeated with each successive video image or with periodic images until target brightness levels are achieved. Once target brightness levels are achieved, the iterative feedback control may be locked-in for some machine vision applications. For other applications, the iterative process may continue periodically or continuously to account for different scenes or changes in lighting conditions.

In accordance with still another embodiment, a method is provided for controlling illumination of a scene that includes directing a camera towards a scene such that one or more objects in the scene are within a field-of-view of the camera; illuminating the scene with a plurality of light sources that preferentially illuminate respective focal regions within the camera's field-of-view; sampling brightness in the respective focal regions of the light sources using the camera; and modulating the light sources based at least in part on the sampled brightness to provide desired brightness levels within the respective focal regions.

For example, the scene may include at least a portion of a person's face, and the one or more objects may include at least one eye of the person. The camera and/or light sources may be mounted on a device on the person's head or at a location remotely from the person's head.

In another example, the scene may include an electronic display, and the camera and/or light sources may be positioned relative to the display such that the camera and light sources are oriented towards a face of a person viewing the electronic display. In this example, the light sources may be modulated to provide desired brightness levels to respective focal regions of the person's face within the camera's field-of-view.

In still another example, the camera and/or light sources may be mounted to a dashboard of a vehicle such that the camera is oriented towards the face of an operator of the vehicle. In this example, the scene may include at least a portion of the operator's face, and the light sources may be oriented towards the operator's face for preferentially illuminating respective focal regions of the operator's face within the camera's field-of-view.

In yet another example, the camera and/or light sources may be directed towards an assembly line or conveyor belt for obtaining images of objects being directed along the assembly line or conveyor belt. In still another example, the camera and/or light sources may be directed towards a plurality of storage areas for obtaining images of objects located in the storage areas. The light sources may be directed towards the assembly line, conveyor belt, or storage areas to preferentially illuminate respective focal regions within the camera's field-of-view, e.g., to provide a substantially uniform brightness level within the field-of-view or variable brightness levels within the field-of-view. For example, the light sources may be modulated to provide greater brightness levels for focal regions that are further from the camera than other focal regions.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which.

DETAILED DESCRIPTION OF THE EXEMPLARY EMBODIMENTS

Figure 1:
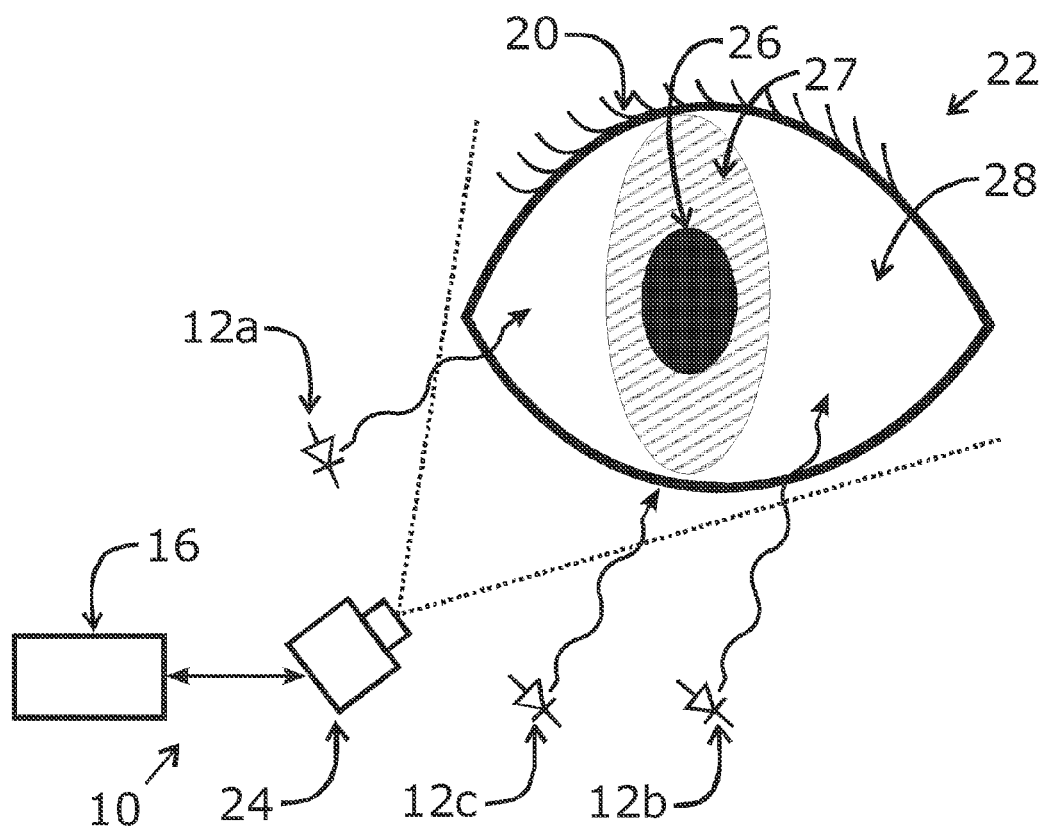
FIG. 1 is a perspective view of spatially uniform illumination of an eye and surrounding facial region using three light-emitting diodes under the control of a processing unit that acquires images from a camera.

Turning to the drawings, FIG. 1 shows an exemplary embodiment of a system 10 that may provide feedback-controlled illumination of an eye and/or nearby facial regions of a person. Generally, the system 10 includes a plurality of light sources 12 (three shown), one or more cameras 14 (one shown), and a processing unit 16 coupled to the light sources 12 and/or camera(s) 14.

Figure 7:
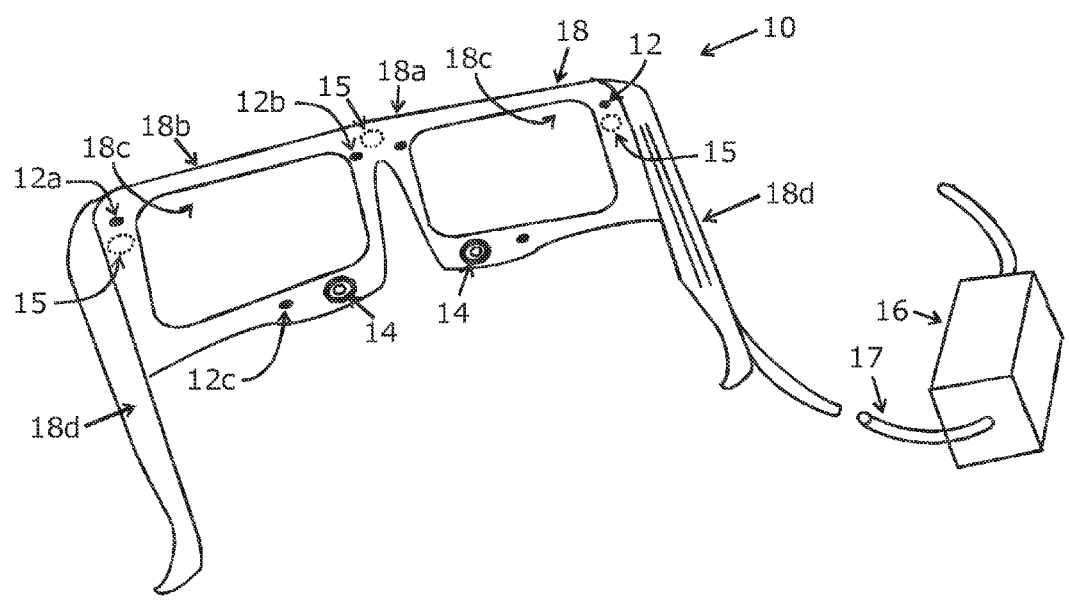
FIG. 7 is a perspective view of yet another embodiment of an apparatus for monitoring a person based upon movement of the person's eye.

The components of the system 10 may be included on a single device or two or more separate devices. For example, as shown in FIG. 7, the camera 14 and light sources 12 may be provided on a frame 18 or other device configured to be worn on a person's head. In the embodiment shown, the frame 18 includes a bridge piece 18a, a rim 18b extending above or around each eye and defining an opening 18c, and/or a pair of ear supports 18d, e.g., similar to a pair of eyeglasses. Optionally, lenses may or not be provided in the openings 18c, e.g., prescription, shaded, polarized, and/or protective lenses, and the like, as desired, although such lenses are not necessary for operation of the system 10. Alternatively, components of the system 10 may be provided on other devices configured to be worn on a person's head, such as a helmet, a mask, a pair of goggles, a pull-down mask, and the like (not shown), such as those devices disclosed in U.S. Pat. No. 6,163,281, 6,542, 081, or 7,488,294, the entire disclosures of which are expressly incorporated by reference herein.

In further alternatives depending upon the application, the components may be provided on separate devices, e.g., stationary or moving structures, for monitoring a person, objects, and/or other scene, as described further elsewhere herein. For example, the camera 14 and/or light sources 12 may be provided remotely from a person yet allow the person to be monitored. In one exemplary embodiment, the camera 14 and/or light sources 12 may be mounted to a dashboard or elsewhere within the a cockpit or other interior region of a vehicle and oriented towards a driver, pilot, or other operator of the vehicle, a passenger, or other person within the vehicle. The positions of the camera 14 and/or light sources 12 may be substantially fixed or adjustable within the vehicle, e.g., such that the camera 14 and/or light sources 12 may be oriented towards the face, e.g., one or both eyes of the operator or other person. In another exemplary embodiment, the camera 14 and/or light sources 12 may be mounted on or adjacent a display of a computer or other electronic device, for example, for monitoring one or both eyes of a user of the electronic device, e.g., to allow the user to control or operate the electronic device based at least in part on movement of one or both eyes.

Optionally, returning to FIGS. 1 and 7, the processing unit 16 may also be carried by the frame 18 or may be separate and/or remote from the frame 18 (and/or other components of the system 10 if provided on other structures than the frame 18), as described elsewhere herein. For example, as shown in FIG. 7, the processing unit 16 may be provided in a casing separate from the frame 18, and may include one or more cables 17 (one shown for simplicity) extending from the frame 18. The cable(s) 17 may include individual cables or sets of wires coupled to the light sources 12, cameras 14, and/or other components on the frame 18 and to the processing unit 16. For example, individual cables or sets of wires may be embedded in the frame 18, e.g., along the rim 18b, from respective light sources 12, cameras 14, 15, and the like, until captured within the cable 15, e.g., to reduce the overall profile of the frame 18, as desired.

With additional reference to FIG. 1, a camera 14 is mounted and/or positioned on the frame 18 such that the camera 14 includes a field-of-view that is directed towards a first eye 20 of a person wearing the frame 18 and/or otherwise being monitored with the system 10, as shown. For example, as shown in FIG. 7, the camera 14 may be offset from a respective opening 18c in the frame 18, e.g., to place the camera 14 away from the general viewing field of a person wearing the frame 18, e.g., as described in co-pending application Ser. No. 12/551,547, filed Jan. 13, 2010, the entire disclosure of which is expressly incorporated by reference herein.

In an exemplary embodiment, the camera 14 may include a CCD or CMOS or other detector including an active area, e.g., including a rectangular or other array of pixels, for capturing images with the camera 14 and generating video signals representing the images. The active area of the camera 14 may have any desired shape, e.g., a square or rectangular shape, a circular or elliptical shape, and the like. The active area of the camera 14 may be substantially flat or may be curved, e.g., to lie within a curved plane that may be oriented towards the eye 22. Exemplary CMOS devices that may be used include Omnivision, Model No. OV7740, or Mocron Model No. MT9V032. In addition, the camera 14 may include one or more filters, lenses, and the like (not shown), if desired, e.g., to focus images on the active area, filter undesired intensities and/or wavelengths of light, and the like.

Optionally, a second camera may be provided that includes a field-of-view directed towards a second eye (not shown) of a person being monitored by the system 10. For example, as shown in FIG. 7, a pair of cameras 14 may be mounted on the frame 18, e.g., on a lower region of the rim 18b below each eye to minimize interference with the person's vision, thereby allowing both eyes of the person to be monitored. In addition or alternatively, multiple cameras may be provided that are directed towards an individual eye of the person (or multiple cameras that are directed towards each eye, not shown), e.g., providing separate or overlapping fields-of-view. In another option, as shown in phantom in FIG. 7, one or more cameras 15 may be provided on the frame 18 that may be oriented away from the person wearing the frame 18, e.g., to acquire images of the person's surroundings, as disclosed in the patents incorporated by reference elsewhere herein.

The light sources 12 may be mounted on the frame 18 at several locations, e.g., around the opening 18c adjacent the camera 14. For example, as shown, three light sources 12a, 12b, 12c are shown, e.g., first and second light sources 12a, 12b on an upper region of the rim 18b and a third light source 12c on a lower region of the rim 18b. It will be appreciated that only two or more than three light sources (not shown) may be provided, if desired, and may be controlled using the systems and methods described herein. If the system 10 includes a second camera 14, as shown in FIG. 7, an additional set of light sources 12 may be provided on the frame 18 for illuminating a second eye and/or facial region (not shown) of a person wearing the frame 18. In addition, if the system 10 includes multiple cameras directed towards an individual eye (not shown), the cameras may share a plurality of light sources or, alternatively, multiple sets of light sources may be provided for illuminating the respective fields-of-views of the cameras (also not shown).

In an exemplary embodiment, each light source 12 may include a light emitting diode configured for emitting a relatively narrow or wide bandwidth of the light, e.g., infrared light at one or more wavelengths between about 640-700 nanometers, broadband visible light, e.g., white light, and the like. Optionally, the light sources 12 may include lenses, filters, diffusers, or other features (not shown), e.g., for facilitating lighting respective focal regions of the person's eye and/or face. The light sources 12 may be spaced apart from one another, e.g., in one or more arrays located around respective openings 18c in the frame 18 to provide desired brightness levels, e.g., substantially uniform or variable level brightness of the person's eye and/or face and thereby of images of the person's eye and/or face captured using the camera 14.

The processing unit 16 may include one or more controllers or processors, e.g., one or more hardware components and/or software modules for operating various components of the system 10. For example, the processing unit 16 may include a separate or integral controller (not shown) for controlling the light sources 12 and/or camera 14, for receiving and/or processing signals from the camera 14, and the like. Optionally, one or more of the components of the processing unit 16 may be carried on the frame 18, e.g., on the ear supports 18d or rim 18b, similar to the embodiments described in the references incorporated by reference elsewhere herein.

The processing unit 16 may also include memory for storing image signals from the camera(s) 14, 15, filters for editing and/or processing the image signals, and the like. In addition, the processing unit 16 may include one or more power sources (not shown), e.g., for operating the components of the system 10. Optionally, the frame 18 and/or processing unit 16 may include one or more transmitters and/or receivers (not shown) for transmitting data, receiving instructions, and the like. In addition or alternatively, the system 10 may include components that are remote from the frame 18 and/or processing unit 16, similar to embodiments disclosed in the references incorporated by reference elsewhere herein. For example, the system 10 may include one or more receivers, processors, and/or displays (not shown) at a remote location from the processing unit 16 and/or frame 18, e.g., in the same room, at a nearby monitoring station, or at a more distant location.

Returning to FIG. 1, an eye 20 and surrounding facial region 22 are shown of a person being imaged using the system 10, e.g., for the purpose of automated pupil-tracking, in which substantially spatially uniform illumination may be useful. The facial region 22 including the eye 20 may be visualized by the camera 14 where images are communicated to the processing unit 16. The pupil 26 is located in the center of the iris 27. The iris 27, in turn, is located within the sclera 28 or white region of the eye. During normal vision, the location of the pupil 26 varies as a result of both voluntary and involuntary muscular control. During movements of the pupil 26, the size and shape of the pupil 26, iris 27, and areas associated with the sclera 28 change within the field-of-view of the camera. In part, changes in size and shape may be due to the curvature of the eye 20.

When illuminated by one or more light sources, a number of factors can influence the intensity of light detected from different regions within the field-of-view of a camera: a) the distances between light sources and the field-of-view region, b) the intensity of each light source, c) the divergence angle of each light source, d) the reflectivity (at illumination wavelength(s)) of the illuminated surface, e) the curvature of the surface, and f) the efficiency of the camera in converting light into useful signals as well as the collection efficiency and spatial uniformity of the optics associated with the camera. In addition, three-dimensional structures can generate shadows if illuminated from a single or small number of light sources. In the case of the region 22 around the eye 20, shadows can be generated by structures that include eyelids, eye lashes, and skin folds.

As described further elsewhere herein, the brightness levels of different regions within the field-Of-view of a camera, such as camera 14 in FIG. 1, may be used, in a feedback mode, to control the intensity of different illumination sources. The use of multiple light sources illuminating a scene from different angles may help to reduce the detrimental effects of shadows. Glints may also be reduced or avoided by using multiple illumination sources and/or by placing them at strategic locations, e.g., well away from the viewing angle of the camera. In the example shown in FIG. 1, infrared light emitting diodes ("LEDs") are used as illumination sources. As shown, LED 12a preferentially illuminates the upper-left region of the field-of-view of the camera 14, LED 12b preferentially illuminates the upper-right region of the field-of-view of the camera 14, and LED 12c preferentially illuminates the lower region of the field-of-view of the camera 14.

Figure 2:
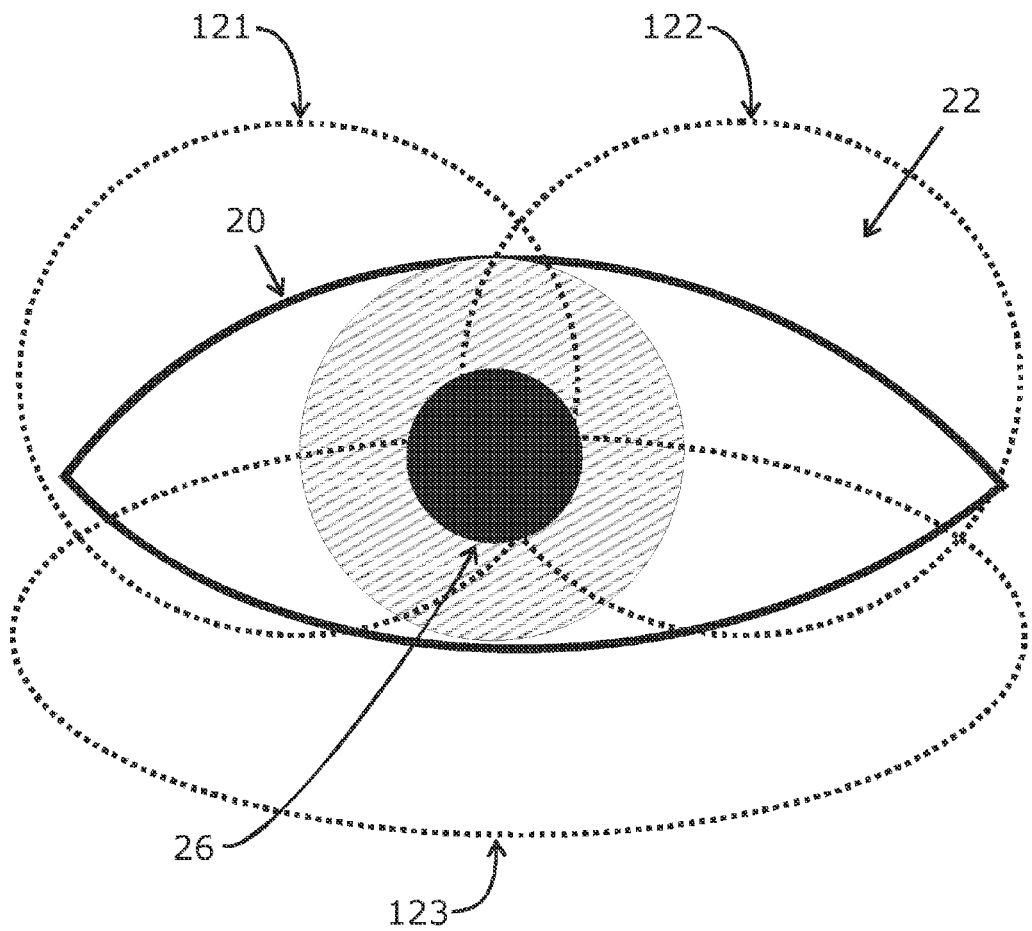
FIG. 2 is an example of illumination patterns of an eye and surrounding facial region generated by three separate light sources.

FIG. 2 shows respective focal regions of illumination by different light sources. In this example, three light sources illuminate a pupil 26 and the facial region 22 around an eye 20. It is understood that light sources generally do not produce sharp boundaries as depicted in FIG. 2. Rather, the dashes lines represent "focal regions," i.e., regions where specific light sources have a preferential or increased influence on illumination of a region compared to surrounding areas within the camera's field-of-view. With reference to FIG. 1, LED 12a preferentially illuminates area 121 of FIG. 2 located in the upper-left region of the camera's field-of-view. Similarly, LED 12b in FIG. 1 illuminates area 122 of FIG. 2 located in the upper-right region of the camera's field-of-view. LED 12c in FIG. 1 illuminates area 123 of FIG. 2 located in the lower region of the camera's field-of-view. The size of the illuminated areas or focal regions may be dependent on the divergence angle of the light source and/or the distance between the light source and the illuminated surface. The general shape of the illuminated area may be dependent on the light profile of the light source as well as the angle between the location of the light source and a vector normal to the illuminated surface. The average brightness of each focal region may be controlled by adjusting the intensity of the associated light source(s).

Figure 3:
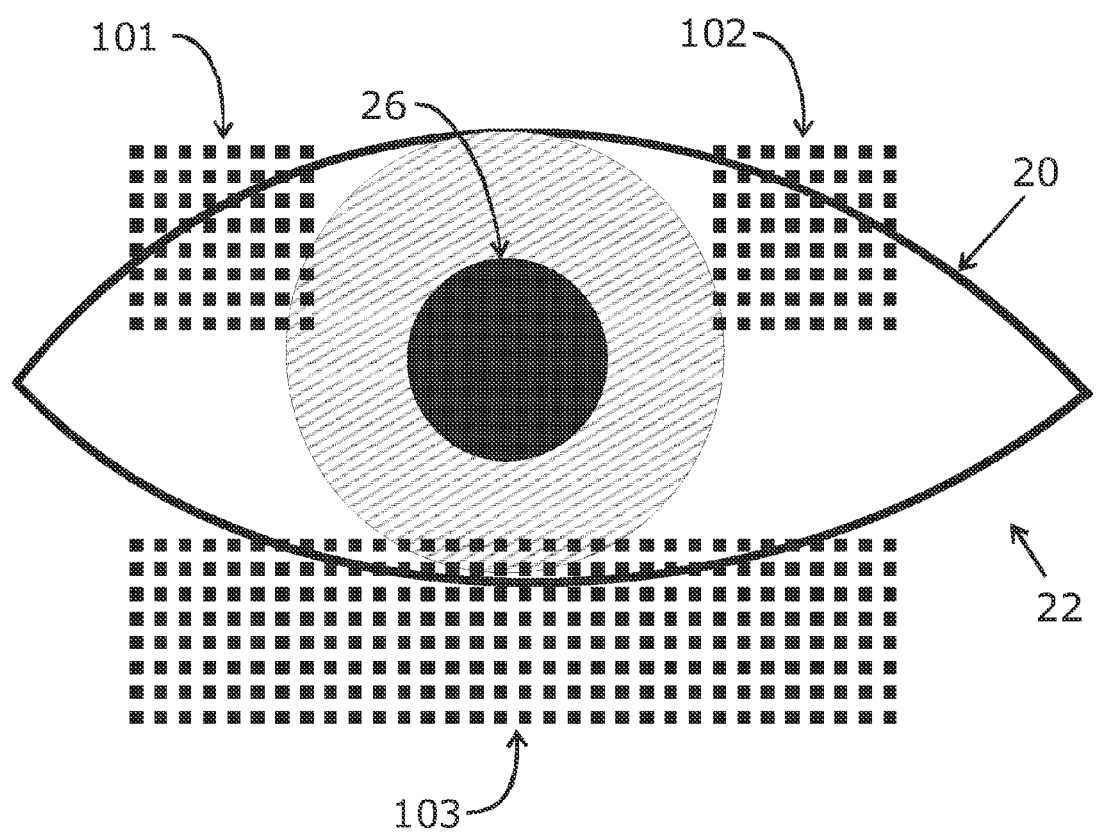
FIG. 3 is an example of a camera image of an eye and surrounding facial region in which three clusters of pixels are sampled to determine average illumination intensities in three regions within a camera's field-of-view.

FIG. 3 is an example of pixel clusters that may be sampled to determine the average brightness of regions in the vicinity of a pupil 26. In this example, the average measured intensity of an eight by eight (8×8) element cluster of pixels 101 is used to assess the brightness of the upper-left region within a camera's field-of-view. Another eight by eight (8×8) element cluster of pixels 102 is used to compute the brightness of the upper-right region within a camera's field-of-view. A third eight by thirty two (8×32) element cluster of pixels 103 is used to assess the brightness of the lower region within the camera's field-of-view.

It will be appreciated, however, that brightness may be assessed from any number of regions with a field-of-view. The assessment of brightness may be determined from any number of pixels in clusters of any size, spacing or shape within each focal region. For example, the same pixels may be sampled during each sampling within each focal region, or different pixels, e.g., randomly selected within each focal region, may be sampled, if desired. Brightness may be sampled using actual video signals during monitoring the eye 20 or may be sampled outside the data stream using for monitoring the eye 20. For example, periodic frames from a series of video signals may be sampled in addition to being recorded, processed, or otherwise monitored, to estimate and/or modulate brightness levels using any of the systems and methods described herein.

For example, with additional reference to FIGS. 1-3, the processing unit 16 may sample predetermined pixels 101, 102, 103 (shown in FIG. 3) in focal regions 121, 122, 123 (shown in FIG. 2) periodically to estimate the average brightness level in each of the focal regions 121, 122, 123. The processing unit 16 may then modulate the light sources 12a, 12b, 12c (shown in FIG. 1) to provide desired brightness levels within the respective focal regions 121, 122, 123. For example, it may be desirable to have substantially uniform brightness when illuminating and imaging the eye 20 with the camera 14. The processing unit 16 may sample the sets of pixels 101, 102, 103, determine the average brightness in each of the focal regions 121, 122, 123, and increase or decrease the intensity of the light sources 12a, 12b, 12c, e.g., to maintain the average brightness substantially uniform and/or otherwise within desired ranges.

Alternatively, if multiple cameras are provided for monitoring an individual eye (not shown), one or more of the cameras may be used to sample brightness within the field-of-view of the camera(s). For example, in one embodiment, a first camera may be used exclusively for brightness sampling, e.g., as described above, while a second camera may be used to obtain images of the eye for other purposes, e.g., monitoring the person's awareness, physical and/or mental state, controlling one or more devices, and the like, as described elsewhere herein and in the references incorporated by reference herein. In another embodiment, multiple cameras may be used to sample brightness within focal regions of respective light sources and the sampled brightness from the multiple cameras may be averaged or otherwise compared to provide feedback control to the light sources.

Figure 4:
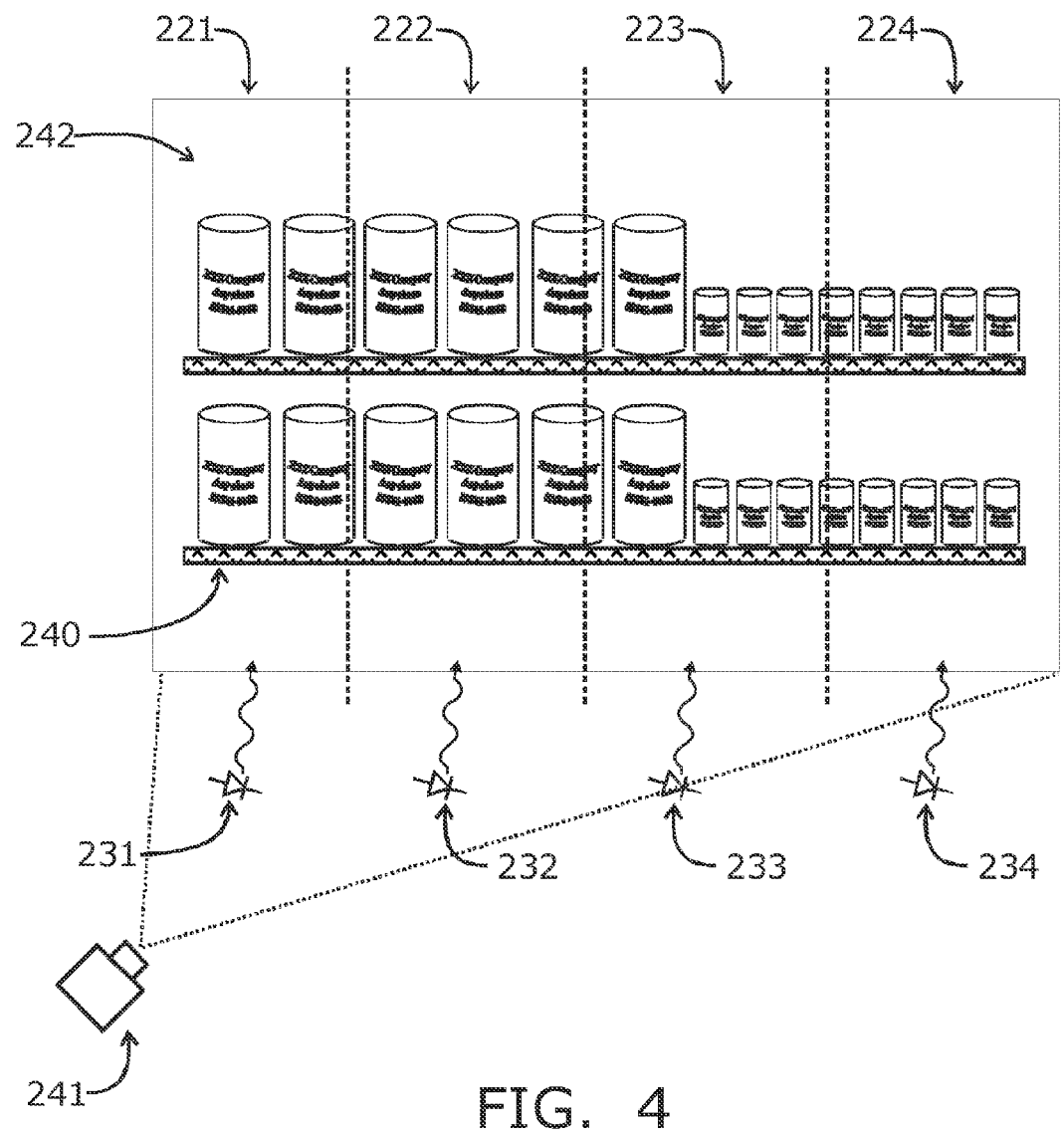
FIG. 4 is an example of controlled illumination of grocery or warehouse shelves where a spatial gradient is desired in the illumination pattern. Illumination is separated into four (4) horizontal regions with progressively increasing brightness toward the right side of the image.

In other applications, it may be desirable to have spatially variable illumination of a scene. FIG. 4 shows such an example of controlling illumination in a situation where a (non-uniform) spatial gradient in brightness 242 may be desired. In this example, a camera 241 may be used to image objects on a series of shelves or conveyor system 240, e.g., such as those commonly found in grocery stores, warehouses, and manufacturing facilities. The camera 241 and light sources 231-234 may be mounted independently relative to one another, e.g., away from the shelves or conveyor system 240 and may be substantially stationary or moving.

In such a situation, some objects and lettering on objects may appear to be smaller than others within images acquired using the camera 241. This may be due to an actual reduced size of objects or because objects are further from the camera. Frequently, the performance of image processing algorithms may be improved by increasing the brightness (without generating saturation) of objects that appear smaller within the camera's field-of-view. Spatially controlled illumination may also be used to help image processing algorithms compensate for spatial variation in the resolution of lenses and other optical components by increasing the ratio of signal-to-noise. Most lenses, particularly small lenses, have a decreased spatial resolution and/or light-gathering capability nearer the outer edges of the lens compared to the central region of the lens.

In the example shown in FIG. 4, a horizontal gradient of brightness may be generated by dividing the field-of-view into 4 vertical regions. The left-most region 221, illuminated by LED 231, may require the least brightness for reliable image processing. The next left-most region 222, illuminated by LED 232, may require the next least level of brightness for reliable image processing. Region 223, illuminated by LED 233, may require more brightness due to the presence of smaller objects. Finally region 224, illuminated by LED 234, may require the most illumination because of the presence of small objects, the objects being furthest from the camera, and/or a decreased optical resolution near the edge of the images acquired using the camera 241.

A processing unit (not shown), similar to those described elsewhere herein, may be coupled to the camera 241 to sample brightness levels within the vertical regions 221-224, and/or may be coupled to the light sources 231-234 to modulate the intensity of the light sources 231-234 in response to the sampled brightness levels. For example, as explained above, the processing unit may modulate the light sources 231-234 to provide increased brightness levels in each of the regions 221-224 to facilitate monitoring images from the camera 241.

Figure 5:
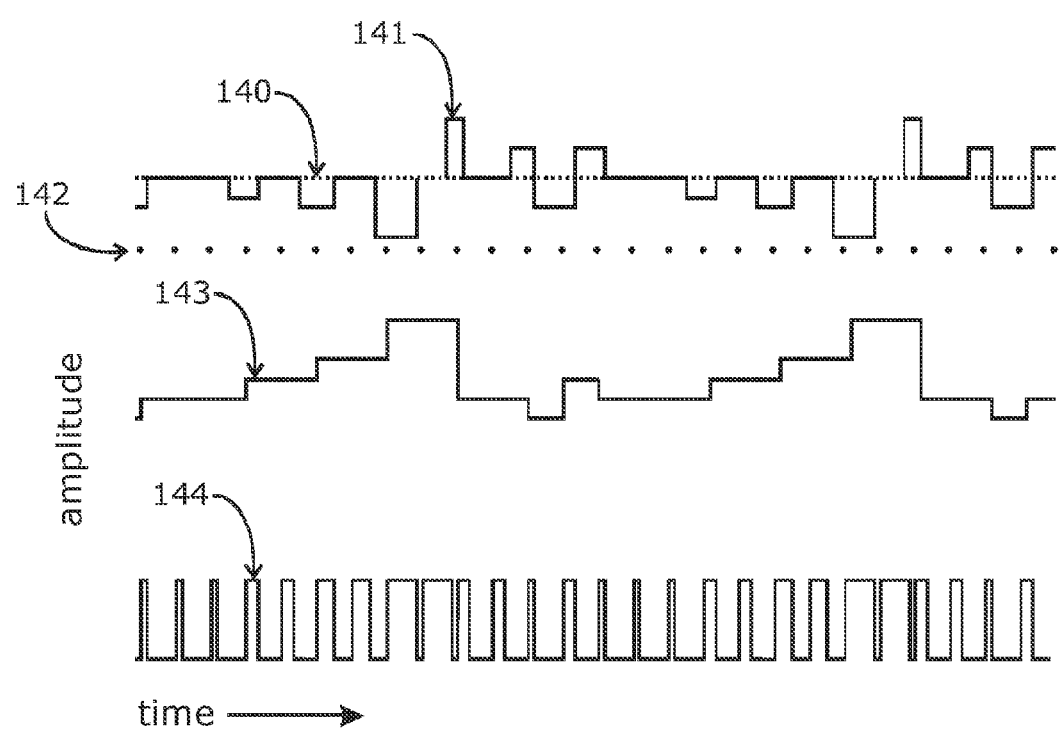
FIG. 5 is an example of the time sequence of feedback and signals used to control illumination using both amplitude modulation and pulse-width modulation techniques.

FIG. 5 is an example of a time sequence of signals used to monitor and control illumination in different regions of a camera's field-of-view. Trace 141 may represent measured average brightness of an individual pixel cluster, while dashed line 140 may represent a target light intensity for a focal region of a light source. Dots 142 may represent times at which new camera images are collected for sampling brightness. If the measured average light intensity falls below the target intensity, different schemes may be used to increase the intensity of the light source associated with the corresponding region. Conversely, if the measured average light intensity rises above the target intensity, the same scheme(s) may be used to decrease the brightness of the light source associated with the corresponding region.

In an exemplary embodiment, trace 143 illustrates a scheme in which the amplitude of either the voltage or the current driving a light source may be used to control light intensity. This is generally referred to as "amplitude modulation." In another embodiment, trace 144 illustrates a scheme is which the duration or "dwell time" of a controlling voltage or current may be modified to control light intensity. This is generally referred to as "pulse-width modulation." Optionally, it may also be possible to use both schemes simultaneously.

If desired, illumination may be turned off at times when not needed such as when the camera is not converting light into useful signals or when the overall device is not in use, for example, to conserve energy and/or to reduce overall illumination intensities, e.g., for safety reasons. For example, the light sources 231-234 in FIG. 4 (or in any other embodiment described herein) may be operated intermittently, e.g., deactivated when the camera 241 is inoperative. In one exemplary embodiment, the camera 241 may be operated periodically to acquire images of its field-of-view as well as sample brightness, e.g., from the acquired images. In this example, the light sources 231-234 may be activated only during the periods when the camera 241 is acquiring images with the brightness of the light sources controlled as described elsewhere herein, e.g., using amplitude modulation and/or pulse-width modulation during the periods of activation. In another exemplary embodiment, the camera 241 may be operated periodically to acquire images of the field-of-view and separately to sample brightness. In this example, the light sources 231-234 may be activated intermittently only during the periods when the camera 241 is activated to acquire images and/or to sample brightness, e.g., using amplitude modulation and/or pulse-width modulation during the periods of activation.

Figure 6:
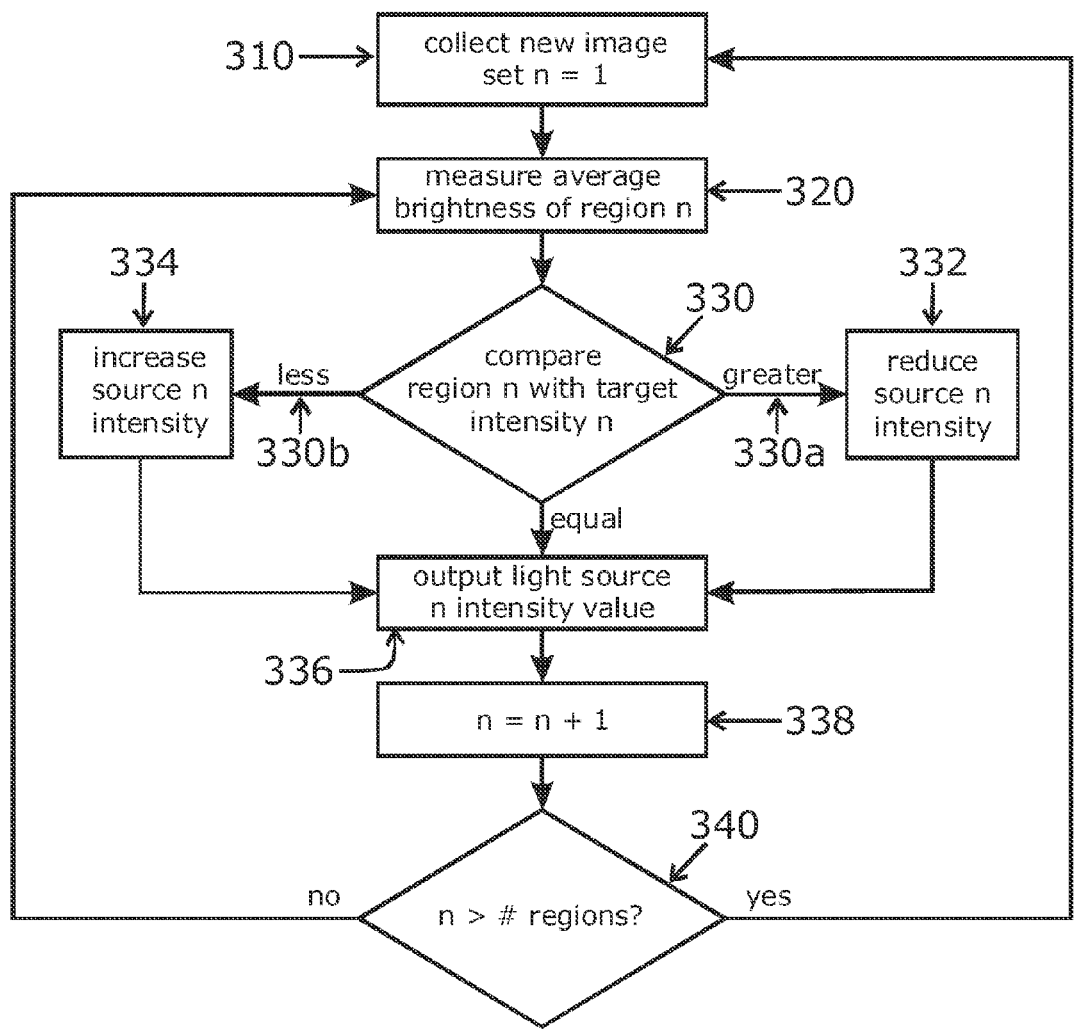
FIG. 6 is a flow chart showing an exemplary algorithm that may be used to control illumination levels of multiple light sources to generate spatially uniform brightness.

FIG. 6 is a flowchart of an exemplary algorithm that may be used to generate feedback control, e.g., to produce controlled or uniform illumination, such as using the system 10 of FIGS. 1 and 7 or the system of FIG. 4. The average brightness of each region (indexed as "n") may be measured successively within video images. For example, at step 310, a new image may be collected from a camera illuminated by a plurality of light sources.

At step 320, the average brightness of a first focal region corresponding to a first light source may be sampled by sampling a plurality of pixels from the new image within the first region. For example, the actual brightness levels of the plurality of pixels within the first region may be obtained and averaged to determine an average brightness for the first region. At step 330, the average brightness may be compared with a target intensity for the first region. If the average brightness is greater than the target intensity (branch 330*a*), at step 332, the output to the first light source is decreased. If the average brightness is less than the target intensity (branch 330*b*), at step 334, the output to the first light source is increased. Thus, at step 336, the first light source is modulated to the desired intensity. At step 338; the number "n" is increased and, at step 340, it is confirmed that another focal region exists that has not yet been sampled. If "n" is less than or equal to the total number of focal regions and light sources, the process is repeated, i.e., steps 320-336 for the second focal region and light source, etc. if all of the focal regions have been sampled from the new image and the light sources modulated, the process is repeated with a new image (starting again at step 310). Thus, with each sampling, the output to the entire array of light sources included in the system may be modulated to desired levels. The process may then be repeated upon collection of the next video image or only periodically, e.g., after every other or every tenth image acquired using the camera providing the sampled brightness.

Target brightness levels may be the same for all regions throughout a camera's field-of-view to generate a scene with substantially uniform brightness, e.g., in the system 10 of FIGS. 1 and 7. Alternatively, target brightness levels may also be selected to vary in different spatial regions within a camera's field-of-view, such as the system depicted in FIG. 4, to partially compensate for the effects of reduced object size within images. Optionally, target brightness within one or more regions may also be elevated to produce spatial gradient patterns, e.g., to enhance analysis, for example, in order to reveal detailed cracks in a surface or subtle changes in color.

Target brightness levels may also be selected to vary as a function of time. If sets of illumination sources are used that emit at different wavelengths, separate target brightness levels may be desired as each wavelength is selected to reveal different structures within camera images.

In some applications, brightness may be dominated by the electromagnetic sources that are a part of the applied illumination system. In other applications, light from the feedback-controlled illumination system may be superimposed on ambient light sources such as the sun or room lighting. In the latter case, it may be necessary to re-converge to desired brightness levels whenever ambient lighting levels change.

Another example of an application where feedback-controlled dynamic lighting may be utilized includes security checkpoints where vehicles or individuals are identified as they approach a camera's field-of-view. In this case, either visible or infrared illumination sources may be dynamically modulated to avoid shadows and/or illuminate objects for uniform scene brightness while avoiding hot-spots within images.

Another example of an application where feedback-controlled dynamic lighting may be utilized is in sorting processes within assembly lines or conveyor belt systems such as those used to sort produce or other foodstuffs, such as apples or fish (not shown). As objects of different reflective properties, sizes, shapes, and/or orientations enter a camera's field-of-view, lighting may be adjusted dynamically to better measure the dimensions and/or identify objects. In this example, the camera (or multiple cameras, as described elsewhere herein) and plurality of light sources may be mounted to stationary supports adjacent an assembly line or conveyor belt and directed towards objects on carried on the assembly line or conveyor belt (not shown). Alternatively, multiple stationary cameras may be provided and multiple sets of light sources may be provided, e.g., that are stationary relative to respective cameras or that are mounted to an assembly line or conveyor belt such that light sources move with objects on the assembly line or conveyor belt.

Another example of an application where feedback-controlled dynamic lighting may be utilized includes alignment systems such as those used to precisely align wheels and drive shafts. Another example of an application where feedback-controlled dynamic lighting may be utilized is in the field of face recognition.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

Further, in describing representative embodiments, the specification may have presented methods and/or processes as a particular sequence of steps. However, to the extent that the methods or processes do not rely on the particular order of steps set forth herein, the methods or processes should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

We claim:

1. A system for monitoring an eye of a person, comprising:
a device configured to be worn on a person's head;
a camera mounted on the device and positioned for viewing a first eye of the person wearing the device;
a plurality of light sources on the device that simultaneously and preferentially illuminate respective separate focal regions of the person's face around the first eye and within the camera's field-of-view, the focal regions only partially overlapping one another; and
a controller coupled to the camera and the light sources, the controller configured for sampling brightness in the respective focal regions of the light sources using the camera and modulating the light sources based at least in part on the sampled brightness to increase or decrease intensity of light from the light sources to provide desired brightness levels within the respective focal regions.

2. The system of claim 1, wherein the controller is mounted on the device.

3. The system of claim 1, wherein the controller is located remote from the device.

4. The system of claim 1, wherein the controller is configured for sampling brightness from multiple pixels that are a first subset less than all of the pixels of the camera that correspond to a first focal region of a first light source within the camera's field-of-view that is illuminated by the first light source, the controller combining the sampled brightness to determine an average brightness provided by the first light source, the controller modulating the first light source to provide a desired brightness level within the first focal region.

5. The system of claim 4, wherein the controller is configured for amplitude modulation of at least one of the current and the voltage to the first light source to provide the desired brightness level.

6. The system of claim 4, wherein the controller is configured for pulse-width modulation of at least one of the current and the voltage to the first light source to provide the desired brightness level.

7. The system of claim 1, wherein the controller is configured for activating the light sources only during periods when the camera is activated to acquire images of the first eye.

8. A feedback controlled system for producing spatially controlled illumination comprising:
a camera that measures scene brightness in two or more spatial regions of a field-of-view;
light sources that simultaneously and preferentially illuminate corresponding separate or overlapping focal regions within the camera's field-of-view, the focal regions having different centers than one another; and
a processor that computes average brightness within each region of the camera's field-of-view and modulates corresponding light sources to one or more target brightness levels to provide desired brightness levels within the field-of-view.

9. The system of claim 8, wherein the camera and the light sources are mounted on a device configured to be worn on a person's head, the camera positioned on the device for viewing a first eye of the person wearing the device, the light sources located on the device for preferentially illuminating respective focal regions of the person's face around the first eye and within the camera's field-of-view.

10. The system of claim 9, wherein the processor is located remote from the device.

11. The system of claim 8, wherein the processor is configured for sampling brightness from multiple pixels that are a first subset less than all of the pixels of the camera that correspond to a first focal region of a first light source within the camera's field-of-view that is illuminated by the first light source, the processor combining the sampled brightness to determine an average brightness provided by the first light source, the processor modulating the first light source to provide a desired brightness level within the first focal region.

12. The system of claim 8, wherein the processor is configured for amplitude modulation of at least one of the current and the voltage to the light sources to provide the desired brightness levels.

13. The system of claim 8, wherein the processor is configured for pulse-width modulation of at least one of the current and the voltage to the light sources to provide the desired brightness levels.

14. The system of claim 8, wherein the processor is coupled to the light sources for activating the light sources only during periods when the camera is activated to acquire images of the first eye.

15. The system of claim 14, wherein the processor is configured for pulse-width modulation of at least one of the current and the voltage to the light sources during the periods when the camera is activated to provide the desired brightness levels.

16. The system of claim 8, wherein the processor is coupled to the light sources for deactivating the light sources when the camera is inactive.

17. The system of claim 8, further comprising an electronic display, the camera and light sources mounted relative to the display such that the camera and light sources are oriented towards a face of a person viewing the electronic display.

18. The system of claim 17, wherein the camera and light sources are mounted to the display.

19. The system of claim 8, wherein the camera is mounted to a dashboard of a vehicle such that the camera is oriented towards the face of an operator of the vehicle.

20. The system of claim 19, wherein the light sources are mounted to the vehicle such that the light sources are oriented towards the face of the operator for preferentially illuminating respective focal regions of the operator's face within the camera's field-of-view.

21. The system of claim 8, wherein the camera is mounted to a structure adjacent an assembly line or conveyor belt for obtaining images of objects being directed along the assembly line or conveyor belt.

22. The system of claim 8, wherein the camera is mounted to a structure adjacent a plurality of storage areas for obtaining images of objects located in the storage areas.

23. The system of claim 22, wherein the light sources are mounted adjacent the storage areas to preferentially illuminate respective focal regions of the storage areas within the camera's field-of-view.

24. A method for controlling illumination of a first eye of a person, comprising:
    positioning a camera towards a person's face such that a first eye of the person lies within a field-of-view of the camera;
    illuminating at least a portion of the person's face with a plurality of light sources that simultaneously and preferentially illuminate respective separate focal regions of the person's face around the first eye and within the camera's field-of-view, the focal regions only partially overlapping one another;
    sampling brightness in the respective focal regions of the light sources using the camera; and
    modulating the light sources based at least in part on the sampled brightness to provide desired brightness levels within the respective focal regions.

25. The method of claim 24, wherein the camera is mounted on a device configured to be worn on a person's head, and wherein the camera is positioned towards the person's face by placing the device on the person's head.

26. The method of claim 24, wherein brightness in the respective focal regions is sampled using a controller coupled to the camera, the controller coupled to the light sources for modulating the light sources based at least in part on the sampled brightness.

27. The method of claim 26, wherein the camera is mounted on a device configured to be worn on a person's head, and wherein the controller is located remote from the device.

28. The method of claim 24, wherein sampling brightness comprises:
    sampling brightness from multiple pixels that are a subset less than all of the pixels of the camera that correspond to a first focal region of a first light source within the camera's field-of-view that is illuminated by the first light source; and
    determining an average brightness provided by the first light source, and
    wherein modulating the light sources comprises modulating the first light source to provide a desired brightness level within the first focal region based at least in part on the determined average brightness.

29. The method of claim 24, wherein modulating the light sources comprises modifying amplitudes of at least one of the current and the voltage to the light sources to provide the desired brightness levels within the respective focal regions.

30. The method of claim 24, wherein modulating the light sources comprises modifying pulse widths of at least one of the current and the voltage to the light sources to provide the desired brightness levels within the respective focal regions.

31. A method for controlling illumination of a scene, comprising:
    directing a camera towards a scene such that one or more objects in the scene are within a field-of-view of the camera;
    illuminating the scene with a plurality of light sources that simultaneously and preferentially illuminate respective separate or overlapping focal regions within the camera's field-of-view;
    sampling brightness in the respective focal regions of the light sources using the camera; and
    modulating the light sources based at least in part on the sampled brightness to provide desired brightness levels within the respective focal regions.

32. The method of claim 31, wherein the scene includes at least a portion of a person's face, and wherein the one or more objects comprise at least one eye of the person.

33. The method of claim 31, wherein the camera is mounted on a device on the person's head.

34. The method of claim 31, wherein the plurality of light sources are mounted on a device on the person's head.

35. The method of claim 31, wherein the camera is mounted at a location remotely from the person's head.

36. The method of claim 31, wherein the plurality of light sources are mounted remotely from the person's head.

37. The method of claim 31, wherein brightness in the respective focal regions is sampled using a controller coupled to the camera, the controller coupled to the light sources for modulating the light sources based at least in part on the sampled brightness.

38. The method of claim 31, wherein sampling brightness comprises:
- sampling brightness from multiple pixels that are a first subset less than all of the pixels of the camera that correspond to a first focal region of a first light source within the camera's field-of-view that is illuminated by the first light source; and
- determining an average brightness provided by the first light source from the brightness sampled from the multiple pixels, and
- wherein modulating the light sources comprises modulating the first light source to provide a desired brightness level within the first focal region based at least in part on the determined average brightness.

39. The method of claim 38, wherein sampling brightness further comprises:
- sampling brightness from multiple pixels that are a second subset less than all of the pixels of the camera that correspond to a second focal region of a second light source within the camera's field-of-view that is illuminated by the second light source; and
- determining an average brightness provided by the second light source, and
- wherein modulating the light sources comprises modulating the second light source to provide a desired brightness level within the second focal region based at least in part on the determined average brightness.

40. The method of claim 31, wherein modulating the light sources comprises modifying amplitudes of at least one of the current and the voltage to the light sources to provide the desired brightness levels within the respective focal regions.

41. The method of claim 31, wherein modulating the light sources comprises modifying pulse widths of at least one of the current and the voltage to the light sources to provide the desired brightness levels within the respective focal regions.

42. The method of claim 31, wherein the light sources are modulated to provide a substantially uniform brightness within the camera's field-of-view.

43. The method of claim 31, wherein the light sources are modulated to provide a predetermined brightness that varies within different portions of the camera's field-of-view.

44. The method of claim 31, wherein the camera and light sources are mounted relative to an electronic display such that the camera and light sources are oriented towards a face of a person viewing the electronic display, and wherein the light sources are modulated to provide desired brightness levels to respective focal regions of the person's face within the camera's field-of-view.

45. The method of claim 31, wherein the camera is mounted to a dashboard of a vehicle such that the camera is oriented towards the face of an operator of the vehicle.

46. The method of claim 45, wherein the light sources are mounted to the vehicle such that the light sources are oriented towards the face of the operator for preferentially illuminating respective focal regions of the operator's face within the camera's field-of-view.

47. The method of claim 31, wherein the camera is directed towards an assembly line or conveyor belt for obtaining images of objects being directed along the assembly line or conveyor belt.

48. The method of claim 31, wherein the camera is directed towards a plurality of storage areas for obtaining images of objects located in the storage areas.

49. The method of claim 31, further comprising acquiring images of the camera's field-of-view using the camera, and wherein the brightness in the respective focal regions of the light sources is sampled from the images acquired using the camera.

50. The method of claim 49, wherein light sources are deactivated when the camera is not acquiring images.

51. The method of claim 31, further comprising acquiring images of the camera's field-of-view using the camera, and wherein the brightness in the respective focal regions of the light sources is sampled separately from the images acquired using the camera.

52. The method of claim 51, wherein light sources are activated only during periods when the camera is acquiring images and during periods when the brightness in the respective focal regions of the light sources is sampled.

\* \* \* \* \*